Oct. 15, 1940.  R. W. LYON  2,217,803
SWIVEL
Filed Nov. 18, 1939  2 Sheets-Sheet 2

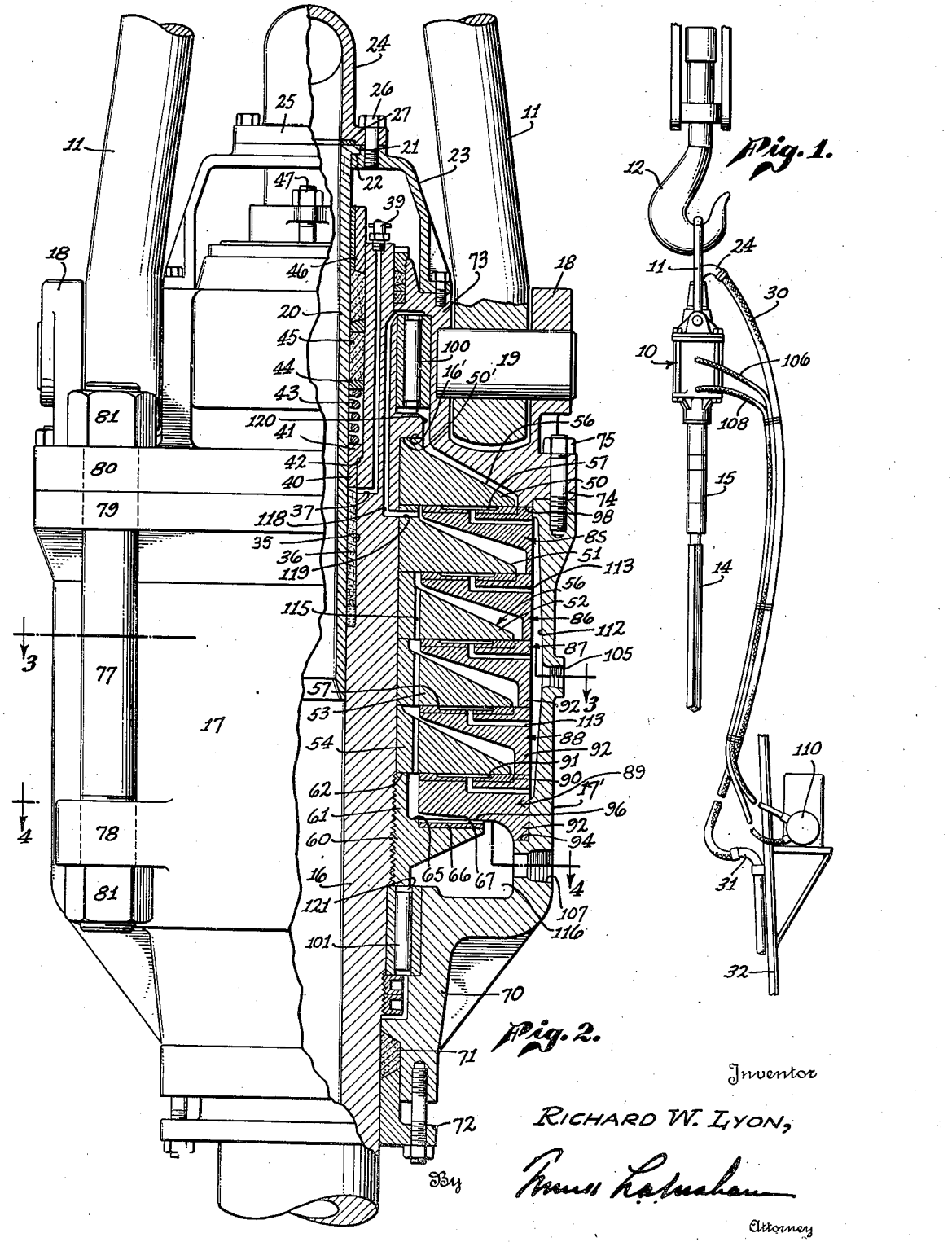

Inventor
RICHARD W. LYON,
By
Attorney

Patented Oct. 15, 1940

2,217,803

UNITED STATES PATENT OFFICE 2,217,803

SWIVEL

Richard W. Lyon, Bellflower, Calif.

Application November 18, 1939, Serial No. 305,128

10 Claims. (Cl. 255—25)

This invention relates to the art of rotary drilling of oil wells and the like. In this class of drilling the drilling string is connected at its upper end to a swivel, the swivel being hung or suspended in the derrick. In view of the fact that oil wells today are drilled to great depths it has been necessary to use much heavier equipment and this is particularly so of the swivel due to the greater weight of the much longer drill stems now in use. Attempts have been made to accommodate this heavy load as for instance the introduction into the swivel of antifriction bearings of common form, in some instances such bearings being stacked one above the other. This construction is objectionable because it is almost impossible to apportion the load throughout the bearings with a consequence that one or two rows of the bearings carry practically ninety percent of the load. To obviate this difficulty swivels have been made much larger in diameter to permit greater bearing areas for such bearings but such construction is objectionable because of the great increase in weight which tends to bow or bend the housing of the swivel out of shape. Swivels now in ordinary use are not properly constructed to accommodate the high drilling speeds such as are now in common use in the drilling industry and it is one of the principal objects of this invention to provide a swivel of simple construction, capable of heavy duty and which is capable of standing the high speed desired of the drilling equipment.

A further object of the invention is to provide a swivel of the character described in which the load is evenly distributed over films of oil between two or more flat bearing faces.

A further object of the inventon is to provide a swivel in which a plurality of disks or bearing plates are used in rotatable relation to each other in which the rotating disks float on a cushion of oil between opposed faces of the disks.

A further object is to provide a swivel of less weight or lighter construction for a given capacity than the ordinary swivel.

Referring to the drawings which are for illustrative purposes only—

Fig. 1 is a diagrammatic vertical elevation of a swivel embodying a form of my invention, the illustration showing the manner of supporting the swivel in the derrick and hose connections thereto;

Fig. 2 is a vertical enlarged elevation of the swivel shown in Fig. 1, a portion being broken away to illustrate the interior construction of the swivel;

Figure 3:
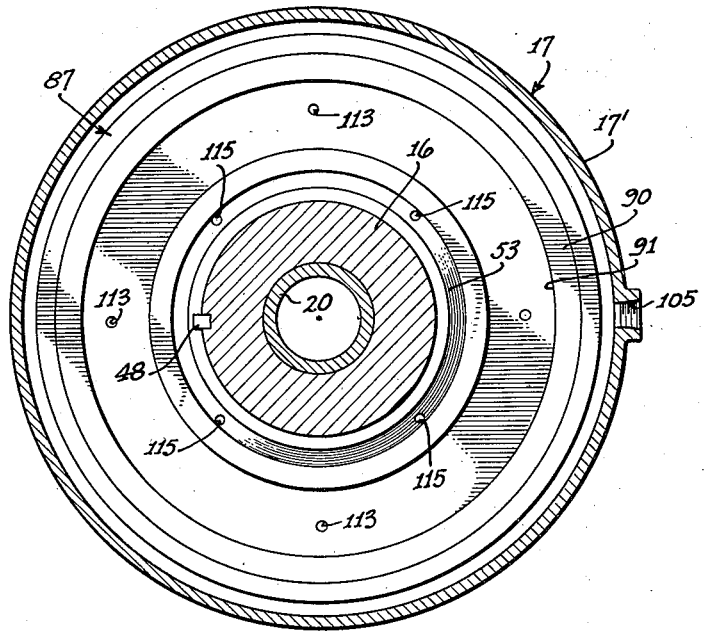
Fig. 3 is a sectional plan view on line 3—3 of Fig. 2.

Referring more particularly to the drawings, as illustrated in Fig. 1, the swivel 10 is suspended by means of a bail 11 from a hook 12 which is attached at its upper end to a hoisting cable or line not shown. 14 designates the kelly which is connected by means of couplings or tool joints 15 to the lower end of a hollow stem indicated at 16 which forms the inner or rotatable member of the swivel.

The stem 16 extends into a housing assembly generally indicated at 17 provided at its upper end with trunnion cradles 18 having mounted therein trunnions 19 which receive the lower ends of the bail 11. The stem 16 may be considered the inner member of the swivel, the same rotating in the housing as will be more fully described hereinafter. Extending into the upper end of the stem is a wash pipe 20 provided at its upper end with an annular flange 21 which seats on an annular shoulder 22 formed in the upper face of a cap 23 on the upper end of the housing assembly, being held thereon by means of an elbow 24 having a flange 25 to receive bolts 26 extending into the cap, a packing ring being provided between the elbow and the upper end of the wash pipe as indicated at 27. The elbow 24 is connected to what is usually termed the rotary hose 30 which is shown in Fig. 1 and extends downwardly to a fitting 31 attached to one of the legs of the derrick indicated at 32. This hose connection is for the purpose of introducing drilling fluid through the swivel into the string for lubricating the drill and the removal of cuttings from the bottom of the hole during the drilling operation. It is to be understood that the hose 30 is flexible and is connected to the derrick and to the wash pipe 20 in such a manner that during the drilling operation as the tool is lowered the flexibility of the hose accommodates the different vertical positions of the swivel as the drilling progresses.

As indicated at 35, the bore of the hollow stem at its upper end is enlarged in diameter to form a lubricant receiving chamber indicated at 36, the lubricant being of the nature of hard grease and introduced into the chamber through a duct or passage indicated at 37 provided at its upper end with a grease gun coupling 39. The grease chamber at its upper end is closed by a ring 40 having an outwardly extending flange 41 at its upper end seated on a shoulder 42, the ring being yieldingly held in place on the shoulder by means of a coil spring 43. The upper end of the spring engages a metal ring 44 which forms the lower end of a packing indicated at 45 held in place at its upper end by means of a follower 46 secured in place by means of bolts 47 which extend into the upper end of the housing.

The hollow stem 16, it will be understood, is caused to rotate during the drilling operation by reason of its connection to the kelly as heretofore described, the kelly being driven from the rotary table in the usual and well known manner. Keyed or otherwise suitably attached to the hollow stem as indicated at 48 in Fig. 3 are a series of inner disks 50, 51, 52, 53 and 54, arranged one above the other within the housing 17. The upper of these disks 50 is provided with a circular engaging face 50' which abuts against an outwardly extending flange 16' formed on the hollow stem. Each of the disks 50, 51, 52, 53 and 54 are beveled downwardly and outwardly as indicated at 56 to a comparatively narrow periphery and are provided with a flat horizontally disposed lower bearing face 57.

The series of disks just referred to are similarly shaped with the exception that the upper engaging face 50' of each successive disk from top to bottom gradually decreases in width. This, as will be explained later, is for the purpose of apportioning the load on the disks. Below the lowermost disk 54 is a follower ring or disk 60 which is provided with a hub 61 having an upper bearing face 62 which engages the lower face of the disk 54.

Figure 4:
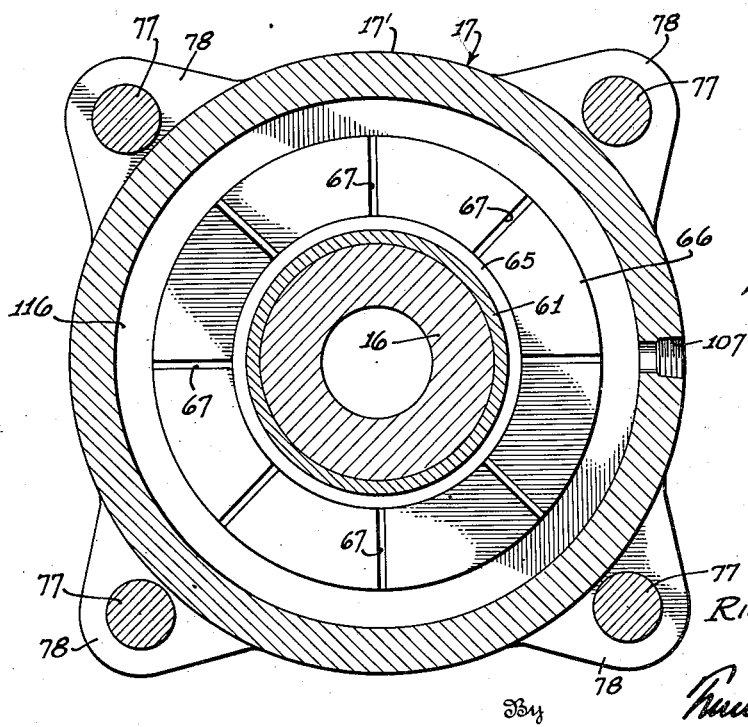
Fig. 4 is a sectional plan view on line 4—4 of Fig. 2.

The disk 60 instead of being beveled downwardly and outwardly as the other disks just described, is provided with a flat upper face 65 horizontally disposed and having seated in such face a flat ring 66, the upper face of which is provided with a series of radially disposed grooves 67 (see Fig. 4) for the purposes hereinafter described. The outer or stationary housing assembly of the swivel comprises two parts, that is, a housing proper indicated at 17' which forms a chamber about the hollow stem and in which the plates or disks heretofore referred to are located. The lower end of the housing 17' terminates in a hub 70 provided with a packing indicated at 71 held in place by a follower 72 bolted to the lower end of the housing. The housing 17' is secured to a head 73 in which the trunnion cradles are formed. This head is secured to the housing proper 17' by means of pins 74 threaded into the housing and projecting upwardly therefrom to receive nuts 75. However, due to the great weight suspended on the swivel, large bolts 77 are provided extending through ears 78 on the housing and through the outer flange 79 on the housing and flange 80 of the head such bolts being provided with nuts 81. Cooperating with the inner rotatable plates or disks 50 to 53 inclusive heretofore described, are a series of outer disks or plates indicated at 85, 86, 87, 88 and 89. Each of these outer disks is provided with an upper flat bearing face which engages through the medium of a film of oil therebetween the lower bearing face of the inner disks heretofore described, except disk 88 which has an additional bearing face which operates with the upper face of the inner disk 60 to provide an upward thrust bearing.

Each of the outer disks 85 to 88 inclusive is provided with a circular plate of bearing metal indicated at 90 having a flat groove or trough 91 formed therein. These outer disks are provided with a downwardly extending flange 92 at the periphery thereof, the lower face of which engages the next lower plate with the exception of the lower disk 88, the flange 92 of which seats on a shoulder 94 in the housing 17'. These flanges successively increase in thickness so that the engaging faces just referred to successively increase from the upper outer disk to the lower outer disk. Further, each of these outer disks are cut away at their under face to accommodate the upper face of the adjacent inner disk leaving a space therebetween. The outer disk 88 is of substantially the same construction as the disks above it with the exception that its lower face engages the lowermost inner disk as indicated at 96. This engagement of the lower face of the outer disk 88 with the upper face of the inner disk 60 leaves an open communication for oil as hereinafter referred to through the radial grooves 67 in the upper face of the disk 60.

The upper outer disk 85 engages a flange 98 on the head of the housing. The swivel is provided near its upper end with roller bearings 100 and at its lower end with a similar roller bearing 101, lubricated as more fully hereinafter described.

The housing 17' is provided with an inlet connection 105 to which may be connected a flexible hose 106 and 107 designates an outlet connection which may also be provided with a flexible hose 108. These two hoses may be attached to the large fluid circulating hose indicated at 30 in any suitable manner, the lower ends of the hose 106 and 108 being connected to a high pressure pump 110 mounted in any suitable manner upon a leg or any convenient part of the derrick as indicated in Fig. 1.

The pump 110 is for the purpose of introducing lubricating oil under pressure into the housing. As such oil enters the housing through the inlet connection 105 it passes into a chamber 112 and through ducts 113 to the grooves or troughs 91 in the upper face of the bearing plates 90 of each outer disk. From such point of introduction the oil by reason of the pressure at which the same is introduced, is caused to flow between each associated inner and outer disk so that the weight of the string on the hollow stem is carried by the outer disks on such film of oil. The oil after passing over these engaging faces is formed through the spaces between the lower face of the outer disks and the upper face of the inner disks and through oil ducts 115 in the inner disks 52, 53 and 54 from which the oil returns outwardly through the grooves 67 in the upper face of the inner disk 60 to a chamber 116 in the housing below the disks. In the stem 16 in back of the upper inner disk 50 a duct extends upwardly as indicated at 118 and communicates with a duct 119 in the disk 51 which receives oil after it has been introduced to the roller bearing 100 through passage 120. The chamber 116 in the lower end of the housing is in communication with the lower roller bearing 101 as indicated at 121. Oil from the chamber 116 is returned to the pump through the outlet 107 and hose 108. From the above description it is apparent that the weight of the drill string, through the medium of the hollow stem and its associated inner disks, is supported on a series of films of lubricating oil between the inner disks and the outer plates on the housing. This arrangement of a multiplicity of bearing faces which distribute the load carried but also provides a highly lubricated structure permitting high speed rotation of the drill string. It is further to be noted that the arrangement and construction of the parts of the swivel is such that the load to be carried can readily be accommodated by varying the number of cooperating disks employed.

I claim as my invention:

1. In a swivel, a suspending member, a suspended member, said members having opposed faces, and means for forcing oil under pressure between said opposed faces.

2. In a swivel, a suspending member, a suspended member, a series of superimposed disks on each of said members having opposed faces, and means for forcing oil under pressure between said opposed faces.

3. In a swivel, a housing, a series of outer disks mounted in said housing, a hollow stem rotatable in said housing, a series of inner disks on said hollow stem, said inner and outer disks having opposed bearing faces, and means for circulating oil under pressure between the opposed faces of said disks.

4. In a swivel, a housing, a series of outer disks mounted in said housing, a hollow stem rotatable in said housing, a series of inner disks on said hollow stem, said inner and outer disks having opposed bearing faces, said outer disks each having an oil duct having its discharge end intermediate the bearing face of the disk, and means for forcing oil under pressure through said ducts.

5. In a swivel, a housing, a series of outer disks mounted in said housing, a hollow stem rotatable in said housing, a series of inner disks on said hollow stem, said inner and outer disks having opposed bearing faces, said outer disks each having a circular trough in its opposed face and an oil duct leading to said trough, and means for forcing oil under pressure through said ducts to the troughs in said outer disks.

6. In a swivel, a housing, a hollow stem rotatable in the housing, upper and lower bearings in said housing engaging said stem, a series of outer disks mounted on the housing extending inwardly therefrom mounted one upon another, a series of inner disks mounted on said stem extending outwardly therefrom mounted one upon another, said outer and inner disks having opposed bearing faces, means for forcing oil under pressure between the opposed faces of said disks, and means for draining the oil from the housing after passing between said outer and inner disks.

7. In a swivel, a housing, a rotatable hollow stem in said housing, a shoulder on the upper portion of said housing, a series of inner disks mounted on said stem one upon another, the upper of said disks engaging said shoulder, a follower disk threaded to said stem engaging the lower of said inner disks, a series of outer disks in said housing, said inner and outer disks having opposed bearing faces, means for forcing oil under pressure between the opposed faces of said disks, said follower disk having a face in engagement with the lower face of the lower outer disk and having a series of outwardly extending grooves to discharge the oil after passing between the opposed faces of said inner and outer disks.

8. In a swivel for use in drilling oil wells, a housing assembly, said assembly comprising a housing, a head on the housing, means for attaching a bail to said head, a hollow stem rotatable in the housing assembly, a wash pipe in the upper end of said hollow stem, means for introducing circulating fluid into said wash pipe, and means for rotatably supporting said hollow stem in said wash pipe comprising, a series of inner disks mounted on said hollow stem, a series of outer disks mounted on said housing, said inner and outer disks having opposed bearing faces, means for forcing oil between the opposed faces of said disks, and bearing means in said housing assembly engageable with said hollow stem.

9. In a swivel, a housing having a chamber therein, a series of outer disks mounted in said housing one above another, a hollow stem rotatably mounted in said housing, a series of inner disks mounted on said stem, said outer and inner disks having opposed bearing faces, means for introducing lubricating oil under pressure into said chamber, duct means in said outer disks communicating with said chamber and the opposed faces of the outer and inner disks, and means for relieving the oil after passing between the opposed faces of the disks.

10. In a swivel, a housing, a series of outer disks mounted in said housing, a hollow stem rotatable in said housing, a series of inner disks on said hollow stem, said inner and outer disks having opposed bearing faces, pump means connected to said housing for forcing oil under pressure between the opposed faces of said disks, and return flow means for the oil from said housing to said pump.

RICHARD W. LYON.